Patented Jan. 16, 1934

1,943,813

UNITED STATES PATENT OFFICE 1,943,813

BRAKE FLUID

Charles W. Copeland, South Bend, Ind., assignor to Bendix Aviation Corporation, South Bend, Ind., a corporation of Delaware No Drawing. Application October 5, 1931
Serial No. 567,143

5 Claims. (Cl. 252—5)

This invention relates to fluid compositions and more particularly to fluid compositions suitable for use in fluid pressure systems such as hydraulic brakes, shock absorbers, etc. Certain specific characteristics are necessary in fluids which are to be used in such systems, which characteristics must all be present if the liquid is to function satisfactorily. Individually, these characteristics may be present in a great many compositions, but compositions having all of the characteristics in combination are extremely rare. The fluid must have a suitable viscosity, varying little throughout a comparatively wide range of temperature, and must have a low freezing point and a high boiling point.

It must not react with the material of which the container, conduit, and other parts of the system are formed, and especially it must not attack rubber or rubber compositions, or metals, such as brass, aluminum, copper, and steel. In addition to the requirement that it shall have no corrosive effect upon these materials, it is necessary that it shall have absolutely no swelling effect on vulcanized soft rubber such as that of which the piston cups and other rubber fittings used in such systems are usually composed. It must have a relatively small co-efficient of expansion and must be both physically and chemically stable throughout wide temperature variations.

Heretofore, there have been proposed compositions of castor-oil and certain alcohols, and compositions of castor-oil and certain esters. I have found that a certain other ester in combination with castor-oil forms a composition which has equally as good characteristics as the characteristics of the prior art compositions mentioned above, and in some respects is superior to the prior art compositions. For instance, the composition obtained has a lower freezing point than the compositions obtained through the use of corresponding amounts of the prior art esters.

An object of this invention is to provide a fluid composition which combines the desirable characteristics mentioned above.

Further objects of the invention will be apparent from the subjoined specification and claims.

A brake fluid composition according to my invention, is composed of 50% castor-oil and 50% ethyl lactate $C_3H_5O_3$—$C_2H_5$ with a small quantity of an organic base. This composition has a comparatively high boiling point, a low freezing point, is very stable and has no deleterious effect upon rubber or metals. The organic base which may preferably be triethanolamine is added to neutralize the free fatty acid, (namely, ricinoleic acid) which sometimes appears in castor oil.

In preparing the solution, I prefer to first neutralize the fatty acid by adding a suitable quantity of triethanolamine to the oil. I prefer to add a slight excess of the base, inasmuch as the excess has no injurious effect. The amount depends upon the amount of acid present in the oil, but by way of example it may be stated that to one liter of oil having 3% fatty acid, from 30 to 35% of triethanolamine should be added slowly and with constant stirring. Thereafter, the solvent is added to the solution also with constant stirring.

Also other oils may be used instead of castor-oil, although I have found the properties of the latter to be especially well adapted for my purpose. Any oil can be used which has a low solidifying point, which is relatively free from fatty acid, which will stand relatively high temperatures and which will not affect rubber.

The specific fluid described above has adequate viscosity throughout relatively wide ranges of temperature, a low freezing point, and a high boiling point. It has no swelling effect upon vulcanized soft rubber and is not corrosive to metal parts. It is stable throughout a wide temperature range and has a relatively small co-efficient of expansion. It has relatively uniform viscosity throughout a wide range of temperature and is relatively non-expensive.

I claim:

1. Fluid for use in fluid pressure apparatus comprising ethyl lactate and an oil characterized by a low freezing point and a high boiling point.

2. A fluid for use in fluid pressure apparatus comprising ethyl lactate and castor-oil.

3. A fluid for use in fluid pressure apparatus comprising ethyl lactate and castor-oil in substantially equal quantities.

4. A fluid for use in fluid pressure apparatus comprising ethyl lactate and castor-oil in substantially equal quantities and a relatively small quantity of an organic base.

5. A fluid for use in fluid pressure apparatus comprising ethyl lactate and castor-oil in substantially equal quantities and a small quantity of triethanolamine.

CHARLES W. COPELAND.